(12) United States Patent
Almen

(10) Patent No.: US 6,505,688 B1
(45) Date of Patent: Jan. 14, 2003

(54) SOIL CONDITIONING IMPLEMENT

(75) Inventor: Peter D. Almen, Devils Lake, ND (US)

(73) Assignee: Summers Manufacturing Co., Inc., Devils Lake, ND (US)

( * ) Notice: Subject to any disclaimer, the term of this patent is extended or adjusted under 35 U.S.C. 154(b) by 0 days.

(21) Appl. No.: 09/656,186

(22) Filed: Sep. 6, 2000

(51) Int. Cl.$^7$ ............................................... A01B 63/00
(52) U.S. Cl. ........................ 172/462; 172/500; 172/711; 172/762; 172/763
(58) Field of Search ................................. 172/462, 497, 172/500, 621, 643, 705, 711, 762, 763

(56) References Cited

U.S. PATENT DOCUMENTS 5,181,573 A    1/1993   Almen ..................... 172/459

OTHER PUBLICATIONS

Disk specification entitled "Supercoulter Gang Assemblies—Manuals/Coulter/SCGangs" which provides a more detailed view of the type of mounting assembly shown in the Summers Diamond Disk Series 10 brochure dated 1998.
Brochure "Summers® Diamond Disk Series 10" *Summers Mfg. Co., Inc*, 4 pps. (1998).
Brochure "Summers® Harrow Packer● Supertiller II Hydraulic Fold Packer, Field Tested Tough!", *Summers Mfg. Co., Inc.*, 4 pps. (1995).
"Master Roll Universal Roller", *T & P Machine and Mfg.*, 2 pps. (Date Unknown).

*Primary Examiner*—Christopher J. Novosad
(74) *Attorney, Agent, or Firm*—Merchant & Gould P.C.

(57) ABSTRACT

A seed bed packer including a frame, a plurality of wheels connected to the frame, and a soil packing element. The packer also includes a spring shank for transferring weight from the frame to the soil packing element. The spring shank includes a first leg connected to the frame and a second leg connected to the soil packing element. When weight is transferred through the spring shank to the packing element, the first and second legs flex toward one another. The spring shanks are capable of distributing the weight of the frame between the wheels and the packing element, while concurrently providing sufficient flexibility to allow the packing element generally uniformly pack the soil, even over rough terrain.

14 Claims, 5 Drawing Sheets

SOIL CONDITIONING IMPLEMENT

TECHNICAL FIELD

The invention is directed generally to agricultural implements for conditioning soil. More particularly, the present invention relates to implements having packer tools intended to achieve a uniform packing of a bed of soil for subsequent planting or to achieve uniform packing of a bed of soil after it has been planted.

BACKGROUND

Known seed bed packers have a frame which is typically towed behind a tractor or other implement. The frame is supported by wheels and includes a tool bar to which packer tools are connected. The problem with some seed bed packers is that most of the weight of the frame rests on the wheels with a lesser amount of weight resting on individual packer tools. As a result, the wheels often pack loose soil much more substantially than the packer tools. Hence, when a crop is planted, discontinuities in growth can be apparent due to the soil packing differences.

U.S. Pat. No. 5,181,573 (commonly assigned) illustrates a drawbar packer having coil packers 28 connected to a frame 14 by connecting assemblies 30. The connecting assemblies 30 allow the packers 28 to pivot relative to the frame 14. Coil springs 48 are provided for biasing the coil packers 28 toward the ground. A concern with the connecting assembly 30 is that it includes movable parts that can require maintenance and are potentially more expensive to manufacture. What is needed is a simple, inexpensive and durable system for transferring weight to the packing elements (e.g., the packer coils) of a seed bed packer to provide optimal soil surface condition and density.

SUMMARY OF THE INVENTION

One aspect of the present invention relates to an agricultural implement including a frame, a plurality of wheels connected to the frame, and a soil conditioning element. The implement also includes a spring shank for transferring weight from the frame to the soil conditioning element. The spring shank includes a first leg connected to the frame and a second leg connected to the soil conditioning element. When weight is transferred through the spring shank to the conditioning element, the first and second legs flex toward one another. The spring shank is capable of distributing the weight of the frame between the wheels and the conditioning element, while concurrently providing sufficient flexibility to allow the conditioning element to generally uniformly condition the soil, even over rough terrain. In one embodiment, the conditioning element is a soil packing element.

A variety of advantages of the invention will be set forth in part in the description that follows, and in part will be apparent from the description, or may be learned by practicing the invention. It is to be understood that both the foregoing general description and the following detailed description are explanatory only and are not restrictive of the invention as claimed.

DETAILED DESCRIPTION OF THE PREFERRED EMBODIMENT

Figure 1:
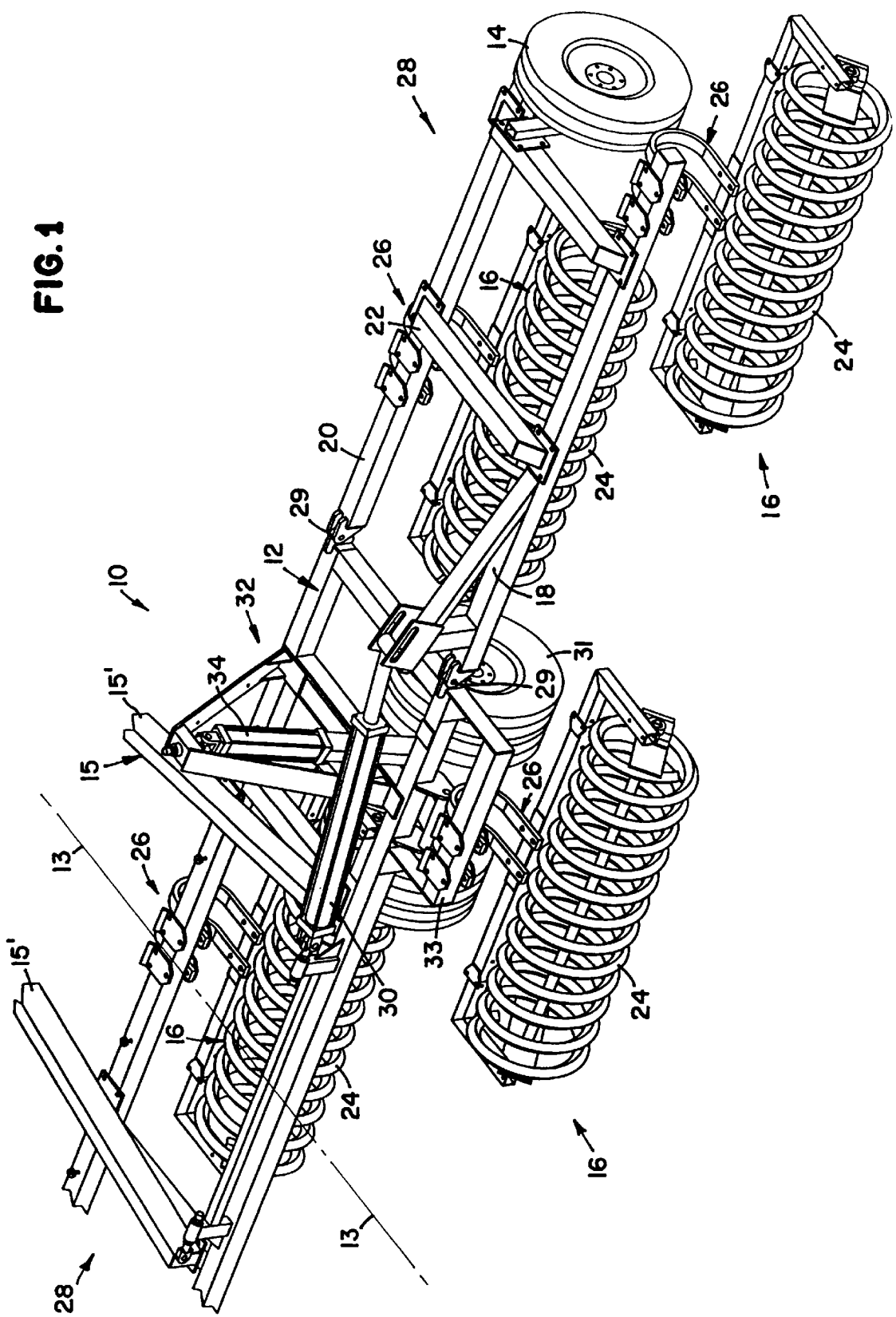
FIG. 1 is a perspective view of a portion of a seed bed packer in accordance with the present invention.

Referring to the drawings, wherein like reference numerals designate identical or corresponding parts throughout the several views, and more particularly to FIG. 1, a drawbar seed bed packer in accordance with the present invention is designated generally by the numeral 10. The seed bed packer 10 is adapted to be towed by a vehicle over soil being prepared for planting or post planting. The seed bed packer 10 includes a frame 12 having a plurality of wheel assemblies 14 connected thereto. A towbar assembly 15 is provided for connecting the frame 12 to the towing vehicle. Coil packer assemblies 16 are connected to the frame 12.

The frame 12 of the seed packer 10 includes a pair of spaced-apart bars 18 and 20 running transverse to the direction of travel of implement 10. A plurality of members 22 are attached to and extend between bars 18 and 20 to provide a rectangular frame work. FIG. 1 shows approximately one half of the frame 12. However, it will be appreciated that the entire seed bed packer 10 is preferable symmetrical about a central axis 13.

The towbar assembly 15 of the frame 12 includes a pair of beams 15' which preferably converge near a structure (not shown) adapted for allowing the seed bed packer 10 to be hitched to the towing vehicle.

The wheel assemblies 14 of the seed bed packer 10 are attached to frame 12 in a known fashion using a dependent bracket in conjunction with bearings, axles, wheels, and appropriate connecting and other hardware. The wheel assemblies 14 may be connected to any part of frame 12 as appropriate, including bars 18, 20 and members 22, as shown in FIG. 1.

The coil packer assemblies 16 of the seed bed packer 10 include coil packers 24 attached through a flexible spring shank assembly 26 to the frame 12. Preferably, a pair of shank assemblies 26 are provided for each coil packer 24. As shown in FIG. 1, some of the coil packers 24 are connected to the toolbar 18, and others are connected to the tool bar 20. The coil packers 24 attached to the tool bar 18 trail the wheels of the various wheel assemblies as shown. The coil packers 24 attached to the bar 20 are positioned between the wheel assemblies and between the coil packers trailing the wheel assemblies thereby providing full packing coverage as the implement is pulled.

Adjacent a central wheel assembly 31, the frame 12 includes an offset bracket 33 attached to the bar 18. One of the coil packers 24 is connected to the offset bracket 33. The offset bracket 33 provides a greater trailing distance between the central wheel assembly 31 and the coil packer 24.

The frame 12 of the seed bed packer 10 includes a center portion 32, and wing portions 28 connected to the center portion 32 by hinges 29. A hydraulic system is provided for pivoting the wing portions 28 relative to center portion 32. For example, the hydraulic system can include cylinder assemblies 30 which function to pivot the wing portions 28 about the hinges 29 between raised and lowered positions. Typically, the wing portions 28 are moved to the raised position for transport of the seed bed packer 10, and are moved to the lowered position for soil conditioning operations. Additionally, cylinder assemblies 34 are provided to lift the entire frame 12 relative to the central wheel assemblies 31. Preferably, the frame 12 is lifted relative to the central wheel assemblies 31 to facilitate transporting the seed bed packer 10. The present invention is equally applicable to an implement either having or not having wing portions.

The flexible spring shank assemblies 26 are shown in more detail in FIGS. 2–5. Each flexible spring shank assembly 26 includes a flexible spring shank 36 and attachment hardware for mounting the spring shank 36 to the frame 12. The term "spring shank" will be understood to mean a non-coiled member that has elastic or spring-like characteristics. The flexible spring shank 36 includes a top portion which is connected to the frame 12 (e.g., to the bars 18, 20 or the offset bracket 33) and a lower portion which is connected to the coil packer assemblies 16. It will be understood that the term "connected to" includes direct connections as well as connections provided by intermediate structures.

Figure 2:
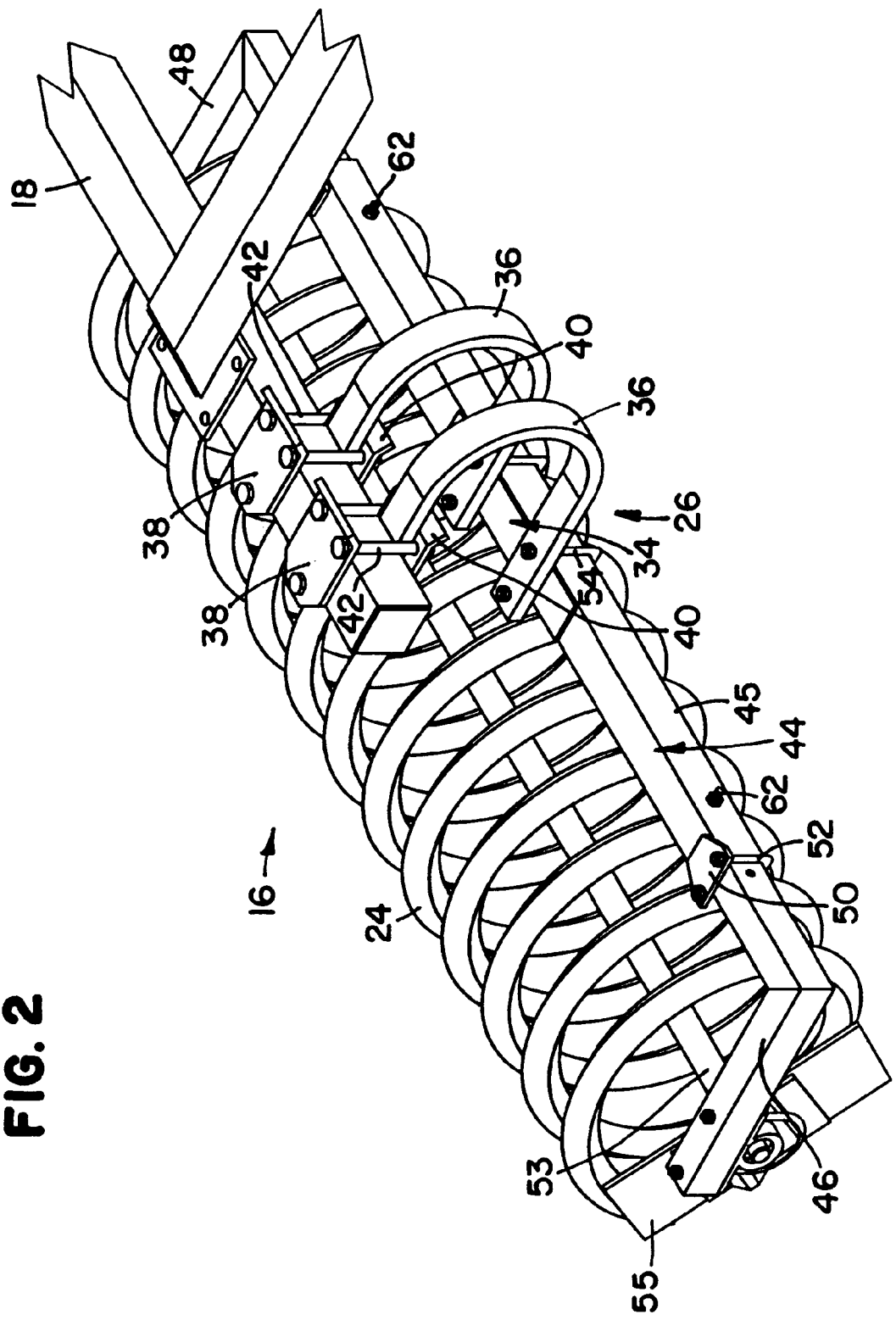
FIG. 2 is a perspective drawing of a coil packer implement and spring shank assembly used by the seed bed packer of FIG. 1.
Figure 3:
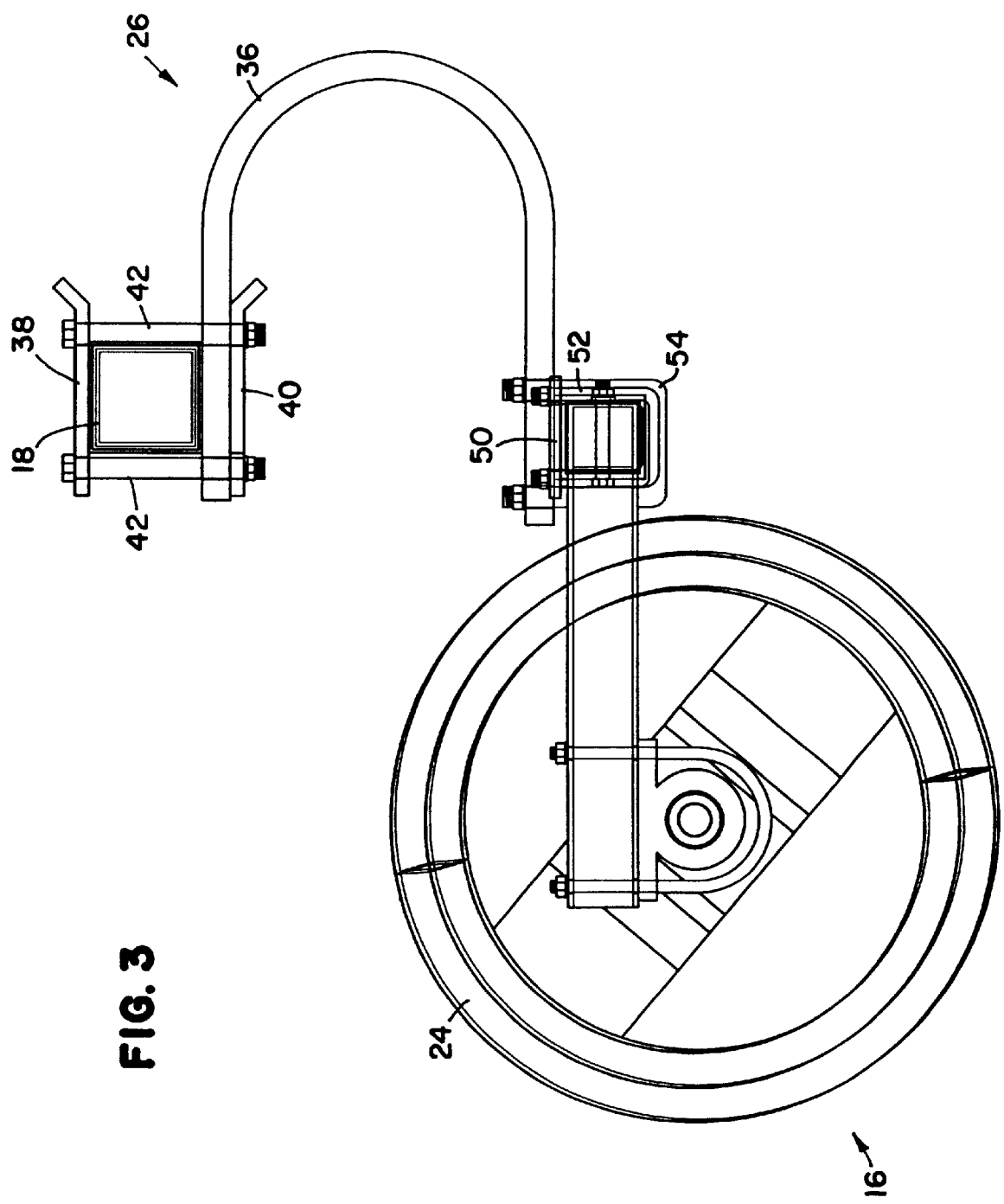
FIG. 3 is a side view of the coil packer implement and spring shank assembly of FIG. 2.

The attachment hardware includes a top plate 38, a bottom plate 40 and bolts 42 and 54. As shown in FIGS. 2 and 3, the bar 18 is clamped between the upper and lower plates 38, 40 by the bolts 42. The upper portion of the shank 36 is clamped between the bottom plate 40 and the underside of the bar 18. It will be appreciated that the upper portion of the shank 36 can be secured to other portions of the frame 12 (e.g., to the bar 20 or to bracket 33) in a similar manner.

Figure 5:
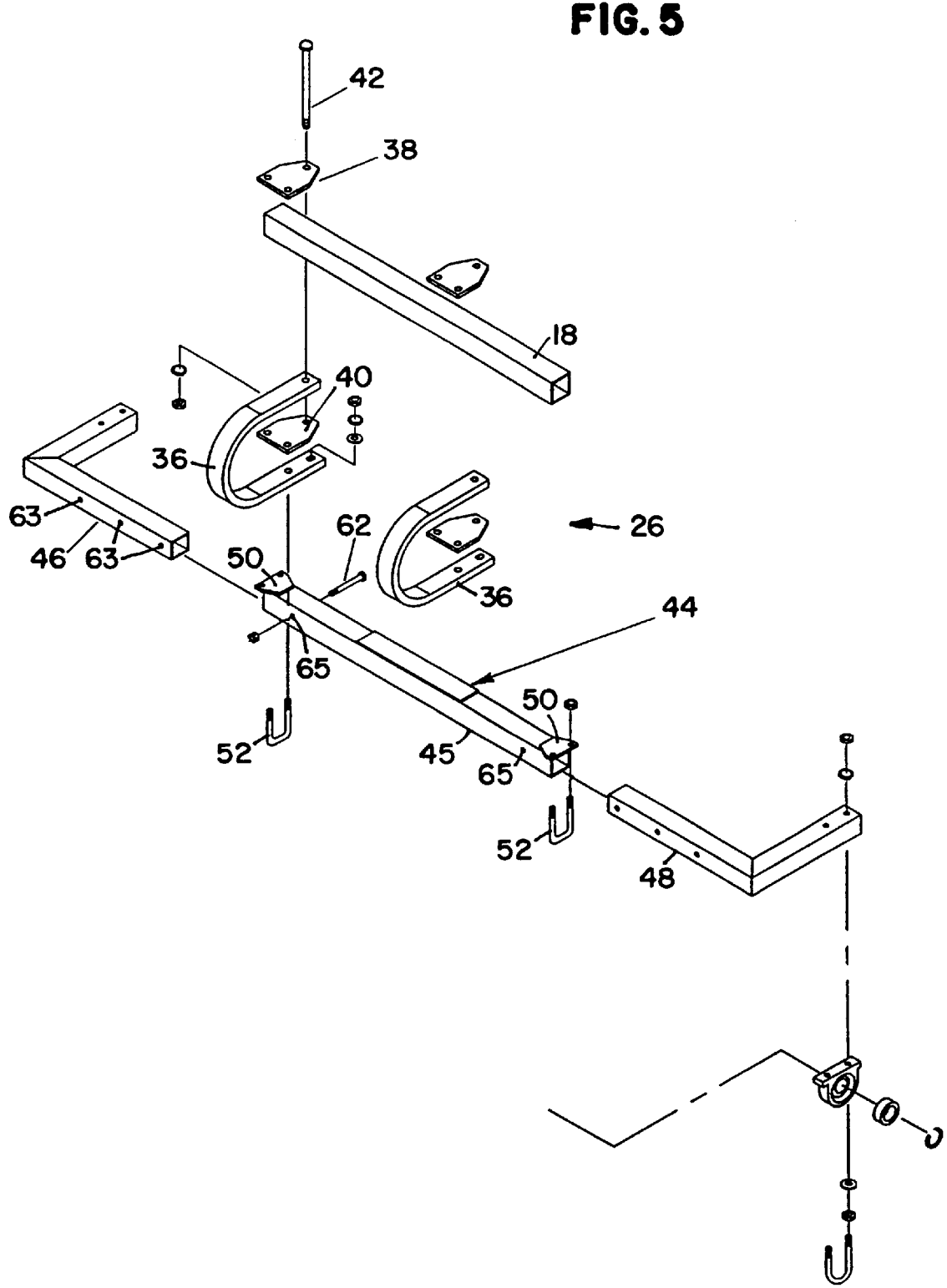
FIG. 5 is an exploded perspective view of portions of the coil packer implement and spring shank assembly of FIG. 2.

Still referring to FIGS. 2 and 3, the bottom portion of the flexible spring shank 36 is attached to the coil packer assembly 16 by way of the U-bolts 54. The U-bolts 54 clamp the bottom portion of the flexible spring shank 36 to a frame 44 which forms a part of the coil packer assembly 16. Particularly, the shank 36 is connected to a piece of square tube 45 that forms a central extension of the frame 44. The central extension of the frame 44 has a center location or midpoint 43 and ends. Attached to the ends of the square tubing 45 are L-shaped tubing members 46 and 48. Legs of the L-shaped tubing members 46 and 48 are inserted within the square tubing 45. In general, the center 43 of the frame 44 of the coil packer assembly 16 is located between opposing ends defined by the L-shaped tubing members 46 and 48. The opposing ends are generally at equal distances from center. As best shown in FIG. 5, the L-shaped tubing members 46 and 48 are retained within the square tubing by transverse bolts 62 that extend through openings 63 defined by the legs of the L-shaped members 46, 48 and through openings 65 defined by the central square tube 45. U-bolts 52 and plate 50 are also used to secure the L-shaped members 46 and 48 to the central tubing member 45.

The L-shaped tubing members 46 and 48 are provided to mount bearings that support the ends of an axle 53. The axle 53 extends parallel to the square tubing piece 45. As shown in FIG. 2, the axle 53 is connected to its corresponding coil packer 24 by end plates 55.

FIGS. 4A–D illustrate various views of the flexible spring shank 36. As shown in the Figures, a mounting hole 56 is provided through the top portion of the flexible spring shank for receiving the bolt 42 that clamps the flexible spring shank 36 to the frame 12. Mounting holes 60 are also provided through the bottom portion of the flexible spring shank 36 for receiving the U-bolt 54 that connects the shank 36 to the frame 44 of the coil assembly 16. As shown in FIG. 2, the shanks 36 are preferably mounted on either side of the center 43 of the frame 44 at a distance closer to the center than to the ends of the coil assembly 16.

Figure 4C:
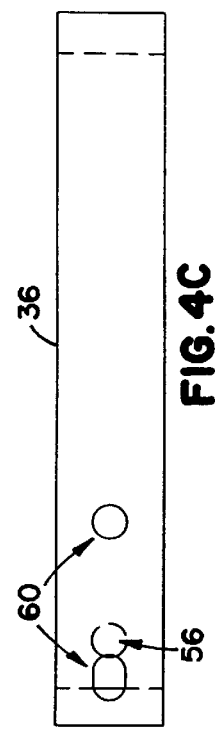
FIGS. 4A–D are several orthogonal views of a flexible spring shank used by the spring shank assembly of FIG. 2.
Figure 4B:
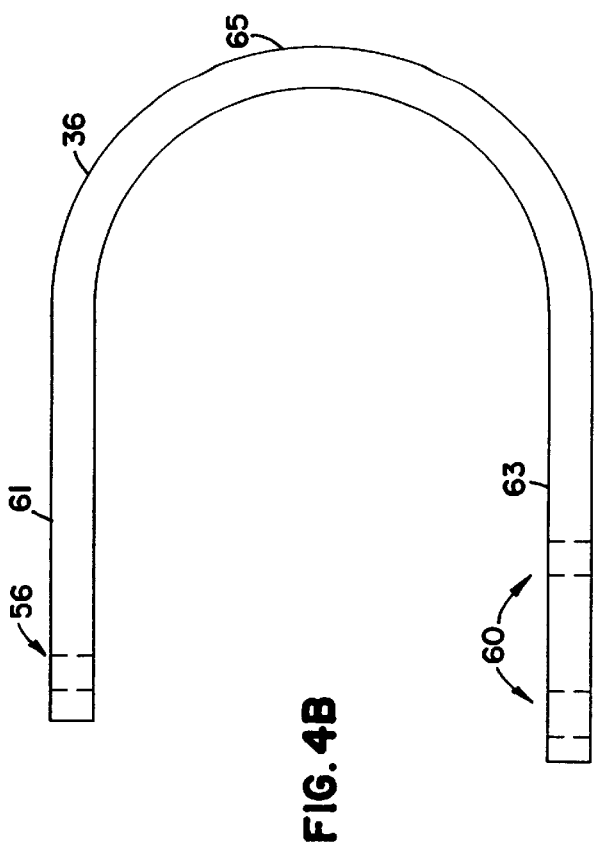
Figure 4A:
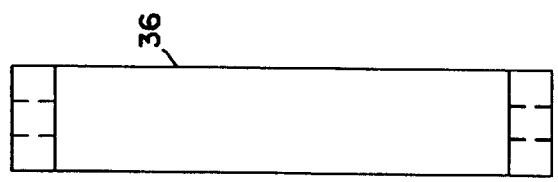
Figure 4D:
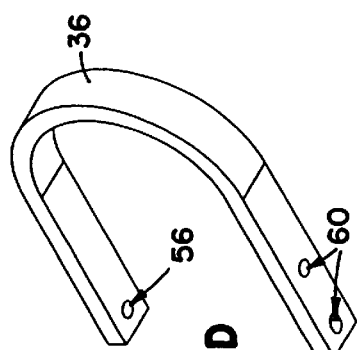

As shown in FIG. 4B, the spring shank 36 is generally U-shaped. In such an embodiment, the "upper portion" comprises a first straight leg 61, and the "lower portion" comprises a second straight leg 63 that is generally parallel to the first leg 61. A curved portion 65 interconnects the legs 61, 63 and holds the legs in vertically spaced-apart relation with respect to one another. In alternative embodiments, the curved portion 65 could be replaced with one or more straight portions. In one non-limiting embodiment, the shank 36 is made of a length (e.g., a bar or strip) of a resilient material (e.g., spring steel) having a rectangular transverse cross-section. However, it will be appreciated that other cross-sectional shapes could also be used.

In use, the seed packer 10 is pulled behind a tractor or other towing vehicle. To prevent the wheels 14 from over packing the soil, the spacing between the legs 61 and 63 is selected such that a significant portion of the weight of the frame 12 is transferred through the shanks 36 to the coil assemblies 16. Preferably, the weight is distributed such that the coil assemblies 16 provide greater packing than the wheels. As weight/loading is transferred through the shanks 36, the legs 61, 63 of the shanks 36 are caused to flex toward one another (i.e., the shanks 36 are compressed such that the spacing between the legs 61, 63 is less than when the shanks are in an at rest, non-compressed state). The configuration of the spring shanks 36 also allows the coil packers 16 to move up and down in response to variations in soil contour. Specifically, the legs 61, 63 of the shanks 36 flex toward and away from one another in response to variations in soil contour thereby allowing vertical movement of the coil packers 16. This flexibility provided by the flexible spring shanks 36 allows the packer coils 16 to apply relatively constant packing loads to the ground even in uneven terrain.

Thus, the embodiment of the apparatus in accordance with the present invention has been described in detail. In this regard, it is understood, however, that the disclosure is exemplary and that equivalents are possible. For example, while coil packers are the preferred packing elements, other packing elements such as press wheels or other similar structures could also be used. Also, other soil conditioners such as rolling baskets could be used instead of packing elements to achieve different types of soil conditioning. Therefore, it is further understood that changes made, especially in matters of shape, size and arrangement to the full extent extended by the general meaning of the terms in which the appended claims are expressed, are within the principle of the invention.

What is claimed is:

1. An agricultural implement comprising:
   a frame;
   a plurality of wheels connected to the frame;
   a support member having a first end, a second end, and a midpoint located between the first and second ends;
   a packing element rotationally coupled to the first and second ends of the support member; and
   a pair of spring shanks for transferring weight from the frame to the packing element, the spring shanks each including a first leg connected to the frame and a second leg connected to the support member, the spring shanks being positioned on opposite sides of the midpoint, and the spring shanks each being positioned at a location closer to the midpoint of the support member than to the first or second end of the support member.

2. The implement of claim 1, wherein the packing element comprises a coil packer.

3. The implement of claim 1, wherein the first and second legs are vertically spaced-apart from one another.

4. The implement of claim 3, wherein the spring shank includes a curved portion that interconnects the first and second legs and holds the first and second legs vertically spaced-apart from one another.

5. The implement of claim 4, wherein the first and second legs are parallel to one another.

6. The implement of claim 1, further comprising a pair of the spring shanks for transferring weight from the frame to the packing element.

7. The implement of claim 1, wherein the first and second legs flex toward one another when weight is transferred through the spring shank.

8. A seed bed packer comprising:

a primary frame;

a plurality of wheels connected to the primary frame;

a plurality of packer coil assemblies, including at least a first packer coil assembly and a second packer coil assembly, each packer coil assembly including:
   i) a coil frame having a midpoint located between two ends;
   ii) a packer coil coupled to the coil frame; and
   iii) a pair of generally U-shaped spring shanks for transferring weight from the primary frame to the packer coil, the spring shanks including vertically spaced-apart first and second legs, the first legs being connected to the primary frame and the second legs being connected to the coil frame, each U-shaped spring shank further being located on opposite sides of the midpoint at a distance from the midpoint of the coil frame, the distance from the midpoint being less than a distance from the end.

9. The seed packer of claim 8, wherein the first and second legs are interconnected by a curved portion of the spring shank.

10. An agricultural implement comprising:

a frame;

a plurality of wheels connected to the frame;

a soil conditioning element, the soil conditioning element including:
   i) a cross bar having a midpoint and two ends;
   ii) first and second L-shaped legs coupled to the ends of the cross bar; and
   iii) a packing coil rotationally mounted between the L-shaped legs; and at least a first and a second spring shank coupled between the frame and the soil conditioning element for transferring weight from the frame to the soil conditioning element, each spring shank including:
   i) an upper extension that couples to the frame; and
   ii) a lower extension that couples to the cross bar, the first and second spring shanks being coupled to the cross bar on opposite sides of the midpoint of the cross bar, at locations closer to the midpoint than to the ends.

11. The implement of claim 10, wherein the soil conditioning element further comprises a packing element.

12. The implement of claim 11, wherein the packing element comprises a coil packer.

13. The implement of claim 10, wherein the upper and lower extensions are substantially parallel to one another and interconnected by a curved portion, wherein the upper and lower extensions of each spring shank flex toward one another when weight is transferred through the spring shank.

14. The implement of claim 10, wherein the upper extensions of the first and second spring shanks mount directly to the frame.

* * * * *